United States Patent [19]

Grosse-Erdmann et al.

[11] Patent Number: 5,634,542
[45] Date of Patent: Jun. 3, 1997

[54] FRICTION CLUTCH WITH A FLYWHEEL

[75] Inventors: Michael Grosse-Erdmann, Schweinfurt, Germany; Joseph L. Bair, Royal Oak; Edwin Murray, Macomb, both of Mich.; Gerda Rudolph, Sao Bernardo do Campo, Brazil; Peter Doll, Troy, Mich.; Heiko Schulz-Andres, Poppenhausen, Germany; George Traub, Ortonville, Mich.; Reinhold Weidinger, Unterspiesheim, Germany

[73] Assignee: Fichtel & Sachs AG, Schweinfurt, Germany

[21] Appl. No.: 501,427

[22] Filed: Jul. 12, 1995

[30] Foreign Application Priority Data

Jul. 12, 1994 [DE] Germany .................. 44 24 479.7

[51] Int. Cl.[6] ............. B60K 17/02; F16D 13/60
[52] U.S. Cl. ............. 192/70.27; 29/447; 403/28; 403/356
[58] Field of Search ............. 192/70.11, 70.27, 192/112; 403/28, 356, 358, 30; 411/DIG. 2, 902; 29/447

[56] References Cited

U.S. PATENT DOCUMENTS

| 216,553 | 6/1879 | Braun | 403/358 X |
|---|---|---|---|
| 1,041,448 | 10/1912 | Dougherty | 403/358 X |
| 3,317,013 | 5/1967 | Smirl | 192/112 X |
| 4,365,696 | 12/1982 | Telford | 192/112 X |
| 4,593,803 | 6/1986 | Valier | 192/70.27 X |
| 4,600,092 | 7/1986 | Billet et al. | |
| 5,380,112 | 1/1995 | Schicktanz et al. | 192/28 |

FOREIGN PATENT DOCUMENTS

| 3802955 | 9/1988 | Germany . |
| 4309570 | 9/1993 | Germany . |
| 2150652 | 7/1985 | United Kingdom . |
| 2193271 | 2/1988 | United Kingdom . |
| 2243884 | 11/1991 | United Kingdom . |
| 2248476 | 4/1992 | United Kingdom . |

*Primary Examiner*—Rodney H. Bonck
*Assistant Examiner*—Saul J. Rodriguez
*Attorney, Agent, or Firm*—Nils H. Ljungman & Associates

[57] ABSTRACT

A friction clutch/flywheel assembly includes a flywheel with a predetermined diametral area designed to hold a preferably cylindrical wall of a basin-shaped clutch housing, so that the clutch housing does not rotate and is also secured against axial movement with respect to the flywheel. The assembly is designed so that there is a clamping device allocated to at least one of the flywheel or the clutch housing, which clamping device is designed to be located in the contact area between the cylindrical wall of the clutch housing and the predetermined diametral area of the flywheel. By means of this clamping device, the flywheel and clutch housing can be held in a non-positive connection with one another.

20 Claims, 3 Drawing Sheets 5,634,542

FRICTION CLUTCH WITH A FLYWHEEL

BACKGROUND OF THE INVENTION

1. Field of the Invention

This invention generally relates to a friction clutch/flywheel assembly for a drive train of a motor vehicle. In a drive train of a motor vehicle, there can typically be an engine for generating mechanical power, wheels for receiving the mechanical power to drive the motor vehicle, a drive shaft assembly for transferring the mechanical power to the wheels, a transmission for varying a gearing ratio between the engine and wheels, and a friction clutch/flywheel assembly for permitting the engine to be engaged and disengaged from the transmission. The flywheel is also typically provided with an external toothing for being engaged by a starter motor for starting the engine. In friction clutch/flywheel assemblies, the flywheel typically has a predetermined diametral area which is designed for the mounting of a preferably cylindrical wall of a clutch housing thereon. The mounting can preferably be non-rotational and secured against axial movements.

2. Background Information

German Patent No. 38 02 955 A1 discloses a friction clutch with a flywheel, wherein the flywheel is designed in the circumferential area for the mounting of a preferably cylindrical wall of a clutch housing. This mounting is non-rotational and secured against axial movements. For this purpose, the flywheel, on its side facing away from the clutch housing, has an encircling notch which runs in the circumferential direction. Lugs located on the exposed end of the cylindrical wall of the clutch housing can be engaged in this notch. In addition, the flywheel is also provided along its circumference with a number of threaded holes, into which screws which traverse corresponding openings in the cylindrical wall of the clutch housing can be tightened.

Since on one hand, there is the recess and a number of threaded holes on the flywheel, and on the other hand, the lugs and a number of openings on the clutch housing, the flywheel and the clutch housing can be very expensive to manufacture. Moreover, on account of the need to tighten the screws, the two elements are also quite expensive to assemble.

OBJECT OF THE INVENTION

The object of the invention is to provide a clutch housing/flywheel assembly wherein the clutch housing can be fastened to the flywheel with minimum effort and expense in terms of manufacturing and assembly.

SUMMARY OF THE INVENTION

The invention teaches that this object can be achieved by means a clamping device allocated to at least one of the two elements (flywheel or clutch housing) in the area of contact between the cylindrical wall of the clutch housing and the predetermined diametral area of the flywheel. By means of the clamping device, the two above-mentioned elements (clutch housing and flywheel) can be held together in a non-positive connection. In other words, the element provided with the clamping device can be non-positively connected with the respective other element, wherein a non-positive connection can be a non-interlocking or non-welded connection, such as a friction fit, for example.

By allocating the clamping device either to the flywheel or to the clutch housing, it becomes possible to produce a non-positive connection between the two elements. In at least one embodiment of the present invention, the clutch housing can thereby essentially be fastened to the flywheel simply by sliding the clutch housing onto the flywheel. Such a connection can thereby keep the effort and expense required for assembly to a minimum. Since with a non-positive connection, it can also be possible to eliminate special structural features which would be necessary with a positive connection, i.e. threaded holes, both the flywheel and the clutch housing can essentially be designed very simply.

There are various technically feasible ways to produce the non-positive connection between the flywheel and the clutch housing. In one possible embodiment, for example, the clamping device can be designed with at least one clamping member, which clamping member can preferably be inserted between the predetermined diametral area of the flywheel and the cylindrical wall of the clutch housing, thereby generating a clamping action between the flywheel and the clutch housing.

Such an additional clamping member can essentially be eliminated if either the flywheel, in the predetermined diametral area thereof, or the clutch housing, along the cylindrical wall, is already provided with a clamping member. As such, this clamping means can be fastened to the respective element in the area of the respective element which comes in contact with the other element. Alternatively, the clamping member can be designed as one piece with the respective element. As a result of the above-mentioned embodiments wherein the elements are provided with clamping members, the number of parts in the friction clutch can be further reduced. This then essentially results in a particularly simple design and construction.

Regardless of whether there are additional clamping members, or if the elements are already provided with clamping members, it is particularly advantageous if the respective clamping members are designed with a wedge-shaped cross section. Such a wedge shape can essentially facilitate the sliding of the clutch housing onto the flywheel, so that, when the clutch housing is first positioned, there is still some clearance between the clutch housing and the flywheel. But this clearance essentially disappears during the motion of sliding the clutch housing onto the flywheel, so that after the clutch housing has travelled a predetermined relative distance, the clutch housing can be clamped to the flywheel and can thus provide a non-positive, or form fit, connection between the two elements.

A particularly advantageous configuration for a clamping member can be provided by a clamping member which is formed as a ring which surrounds the axis of rotation of the flywheel. With this configuration, the clamping action can be distributed over the total contact area between the flywheel, on the one hand, and the clutch housing, on the other hand. A ring-shaped configuration of the clamping means also essentially makes possible a concentric orientation of the flywheel and clutch housing relative to the axis of rotation of the friction clutch.

In another embodiment of the present invention, the clamping member can essentially be activated by shrink-fitting one of the two elements onto the other. This shrink-fitting essentially makes possible a particularly simple installation of the clutch housing on the flywheel, since, for example, the clutch housing can be slid onto the latter with some clearance, and the non-positive connection can then be achieved only when the clutch housing is shrink-fitted onto the flywheel. A shrink fit can be achieved, for example, if the clutch housing is heated before the housing is slid onto the flywheel to thereby first expand the clutch housing. Then, after the clutch housing has been properly oriented on the flywheel, the clutch housing would contract as it cools, thereby providing the shrink-fit connection.

Unless the clutch housing is being shrink-fitted onto the flywheel, axial forces would generally need to be applied when the clutch housing is being slid on, since forces acting essentially in the radial direction between the clutch housing and the clamping means, on the one hand, and between the clamping means and the flywheel, on the other hand, must be overcome. It can therefore be advantageous to provide recesses on the clutch housing to provide access to the clamping member. A tool having a pressure application member can then be provided with the pressure application member inserted into the recesses to contact the clamping member. In addition to facilitating handling during assembly, these recesses can essentially also guarantee that damage to the clutch housing can be prevented when the clutch housing is being slid onto the flywheel.

Conversely, for disassembly, an axial force must be applied in the reverse direction to remove the clutch housing from the flywheel against the action of the above-mentioned radial forces. For this purpose, the clutch housing can preferably be designed with notches in the vicinity of the contact area, into which notches tension means of another tool, preferably an extraction tool, can be inserted.

In an alternative embodiment of a flywheel, wherein the flywheel is provided with a flexible plate on the side of the flywheel facing the engine, for connecting the flywheel to the drive shaft of the engine, the flexible plate can be configured to extend beyond the peripheral edge of the flywheel to act as an axial stop for the clutch housing as the clutch housing is being slid onto the flywheel in the axial direction. Additional limiting means to restrict the depth to which the clutch housing is slid onto the flywheel are thereby unnecessary.

The flexible plate can also, in another embodiment of the present invention, be designed to radially encircle at least the edge of the clutch housing that is disposed about the flywheel. This encircling portion of the flexible plate can then additionally be configured as a ring gear for the starter.

The embodiments of the present invention will be discussed in more detail herebelow with reference to the accompanying figures. It should be understood that when the word "invention" is used in this application, the word "invention" includes "inventions", that is, the plural of "invention". By stating "invention", Applicants do not in any way admit that the present application does not include more than one patentably and non-obviously distinct invention, and maintains the possibility that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

In summary, one aspect of the invention resides broadly in a friction clutch and flywheel in combination for transmitting mechanical rotary power from an output shaft of an engine of a motor vehicle to an input shaft of a transmission of the motor vehicle, the friction clutch and flywheel combination comprising: a clutch portion; the clutch portion comprising: a hub; the hub defining an axis of rotation; the hub comprising apparatus for non-rotationally connecting the hub to an input shaft of a transmission; a hub disc disposed about the hub; the hub disc comprising apparatus for non-rotationally connecting the hub disc to the hub; at least a first plate rotatable about the axis of rotation relative to the hub; first apparatus for transmitting rotational torque between the hub disc and the at least a first plate for rotating the hub disc with the at least a first plate; friction linings disposed on the at least a first plate; a housing disposed about at least a portion of the clutch; the housing having a wall portion disposed about the axis of rotation; the friction clutch and flywheel combination further comprising a flywheel portion; the flywheel portion comprising: a disc-shaped member for being disposed axially adjacent the friction linings; the friction linings being disposed to engage with the disc-shaped member and disposed to rotate with the disc-shaped member; and apparatus for non-rotationally connecting the disc-shaped member to an output shaft of an internal combustion engine for rotation of the disc-shaped member with the output shaft; and the friction clutch and flywheel combination further comprising holding apparatus for substantially permanently holding the housing and the disc-shaped member together; the holding apparatus providing a frictional engagement for holding the housing and the disc-shaped member together; and the holding apparatus comprising substantially the sole apparatus for holding the housing and the disc-shaped member together, the holding apparatus being disposed between at least a portion of the housing and at least a portion of the disc-shaped member.

Another aspect of the invention resides broadly in a friction clutch and flywheel in combination for transmitting mechanical rotary power from an output shaft of an engine to a further shaft for receiving mechanical rotary power, the friction clutch and flywheel combination comprising: a flywheel portion, the flywheel portion comprising: a disc-shaped member; and apparatus for non-rotationally connecting the disc-shaped member to an output shaft of an engine for rotation of the disc-shaped member with the output shaft; and the friction clutch and flywheel combination comprising: a clutch portion, the clutch portion comprising: a hub; the hub defining an axis of rotation; the hub comprising apparatus for non-rotationally connecting the hub to a shaft for receiving mechanical rotary power; at least a first plate disposed with the hub; apparatus for transmitting rotational torque between the hub and the at least a first plate for rotating the hub with the at least a first plate; friction linings disposed on the at least a first plate; the friction linings being disposed to engage with the disc-shaped member and disposed to rotate with the disc-shaped member; apparatus for engaging and disengaging the friction linings with the disc-shaped member; the friction clutch and flywheel combination comprising a housing disposed about at least a portion of the clutch, the housing having a wall portion disposed about the axis of rotation; and the friction clutch and flywheel combination further comprising holding apparatus for holding the housing and the disc-shaped member together; the holding apparatus providing a frictional engagement for holding the housing and the disc-shaped member together; and the holding apparatus comprising substantially the sole apparatus for holding the housing and the disc-shaped member together.

Another aspect of the invention resides broadly in a method for assembling a friction clutch and flywheel combination for transmitting mechanical rotary power from an output shaft of an engine to a secondary shaft for receiving mechanical rotary power, the clutch and flywheel combination comprising a flywheel, the flywheel comprising: a disc-shaped member, and apparatus for non-rotationally connecting the disc-shaped member to an output shaft of an engine; the clutch and flywheel combination additionally comprising: a clutch, the clutch comprising: a hub, the hub defining an axis of rotation, the hub comprising apparatus for non-rotationally connecting the hub to a second shaft for receiving mechanical rotary power; at least a first plate disposed with the hub; apparatus for transmitting rotational torque between the hub and the at least a first plate for rotating the hub with the at least a first plate; friction linings disposed on the at least a first plate, and adjacent the disc-shaped member; and apparatus for engaging and disengaging the friction linings with the disc-shaped member; and the clutch and flywheel combination further comprising a housing disposed about at least a portion of the clutch, the method comprising the steps of: providing the clutch, the providing of the clutch comprising the steps of: providing the hub, the hub defining an axis of rotation; providing the apparatus for non-rotationally connecting the hub to a second shaft; disposing the at least a first plate about the hub; providing the first apparatus for transmitting rotational torque between the hub and the at least a first plate for rotating the hub with the at least a first plate; disposing friction linings on the at least a first plate; and providing the apparatus for engaging and disengaging the friction linings with the disc-shaped member; providing the housing about at least a portion of the clutch; providing the flywheel, the providing of the flywheel comprising: providing the disc-shaped member; and providing the apparatus for non-rotationally connecting the disc-shaped member to an output shaft of an internal combustion engine; and disposing at least a portion of the disc-shaped member radially adjacent to at least a portion of the housing; and frictionally engaging the radially adjacent portions of the disc-shaped member and the housing to hold the housing and disc-shaped member together in a non-rotational and non-axially movable connection, wherein the frictionally engaged radially adjacent portions comprise substantially the sole apparatus for holding the housing and the disc-shaped member together.

BRIEF DESCRIPTION OF THE DRAWINGS

The present invention is described in greater detail hereinbelow with reference to the accompanying drawings, in which.

DESCRIPTION OF THE PREFERRED EMBODIMENTS

Figure 1:
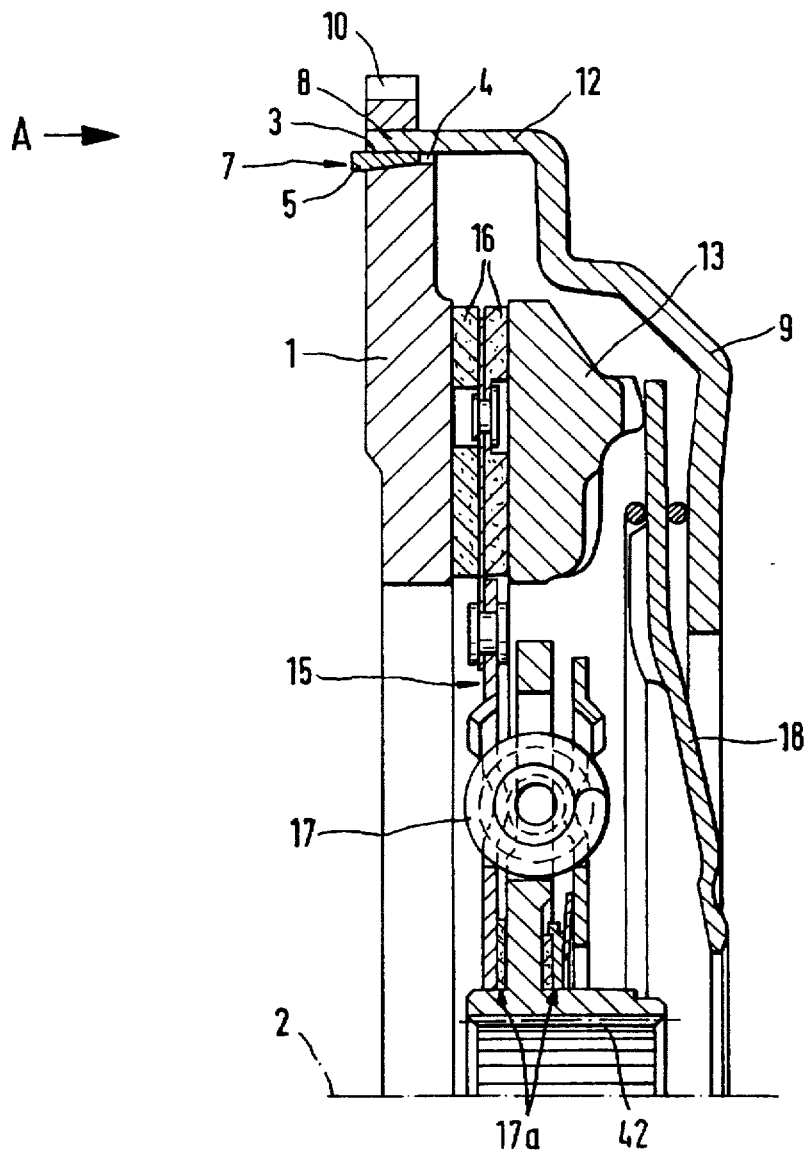
FIG. 1 shows, in longitudinal section, a friction clutch with a flywheel and a clutch housing which has a cylindrical wall in the circumferential area, as well as a clamping device located radially between two.
Figure 2:
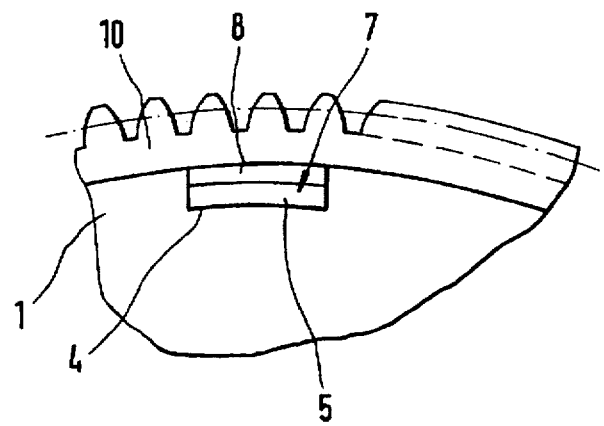
FIG. 2 shows a detail of the area of the connection between the clutch housing and the flywheel, viewed in direction A as illustrated in FIG. 1.

The friction clutch/flywheel assembly illustrated in FIG. 1 includes a flywheel 1 which rotates with and is equiaxially connected to a crankshaft (not shown). The crankshaft rotates around an axis of rotation 2 and is part of an internal combustion engine (not shown). The crankshaft can be connected to the flywheel 1 via a flexible plate 31 and bolts 43a and 43b. In FIG. 1, the flywheel 1 is designed so that in a predetermined diametral area 3, e.g. in the circumferential area, it has depressions 4 (see also FIG. 2), in which a clamping element 5 of a clamping device 7, and a tab 8 of a clutch housing 9, can be engaged essentially without play in the circumferential direction. The flywheel 1 can preferably be bevelled on its side facing the clamping element 5, whereby the diameter of the flywheel 1 preferably increases toward the clutch housing 9. The clamping element 5 can be configured to essentially match this bevelled portion, and as such the clamping element 5 can be tapered in a wedge shape toward the clutch housing 9. The clamping element 5, like the tab 8 of the clutch housing 9, can be surrounded by a starter ring gear 10, which ring gear 10 is otherwise in contact with the circumferential area of the flywheel 1.

The clutch housing 9, in the circumferential area, can preferably have a substantially cylindrical wall 12. On the exposed side, or radially inward side of this cylindrical wall 12 there can preferably be the tabs 8.

The clutch housing 9 encloses a pressure plate 13, which pressure plate 13 is essentially in the shape of a ring-shaped disc, and is guided so that it does not rotate in the circumferential direction but can move axially with respect to the clutch housing 9. Axially between the flywheel 1 and the pressure plate 13 there can be a clutch plate 15 which can be equiaxial with the axis of rotation 2, and can be moved axially in the conventional manner, but is non-rotationally connected to an input shaft (not shown) of a transmission by means of a toothing 42. This clutch plate 15 preferably supports friction linings 16 and can include torsion vibration dampers 17 and frictional vibration dampers 17a which are not shown in any detail. The friction linings 16 of the clutch plate are active when the pressure plate 13 is pressed toward the flywheel 1 by a membrane spring 18 mounted on the clutch housing 9. The clutch can also be provided with a release assembly (not shown) which releases the pressure of the membrane springs 18 on the pressure plate 13, thereby permitting the clutch to be disengaged. In general, the above-discussed clutch components are well known and are not described in any further detail herein.

To assemble the clutch housing 9 onto the flywheel 1, the clutch housing 9 can be positioned relative to the flywheel 1 in terms of its angle of rotation, so that the tabs 8 on the cylindrical wall 12 can each be aligned with a depression 4 on the flywheel 1. By means of an axial movement on the clutch housing 9, the tabs 8 can then be inserted into the depressions 4. The adhesion necessary for the connection of the clutch housing 9 to the flywheel 1 can be generated in several ways, as discussed hereinbelow.

In one possible embodiment of the present invention, it is possible to design the starter ring gear 10 so that it has some clearance with respect to the circumferential area of the flywheel 1. The tabs 8 of the clutch housing 9 can then be inserted, and then, the clamping elements 5 can be inserted into the respective depressions 4 from the side of the flywheel 1 facing away from the clutch housing 9. The clamping element 5 can be inserted into the depressions 4 until the necessary adhesion is created between the tabs 8 of the clutch housing 9 and the ring gear 10 on one hand, and between the tabs 8 via the clamping elements 5 and the flywheel 1 on the other hand.

Another conceivable way for generating the adhesion is by shrink-fitting the ring gear 10 about the flywheel 1. Thus, before the installation of the starter ring gear 10, the tabs 8 of the clutch housing 9 and also the clamping elements 5 can be arranged in a predetermined position in relation to one another and with respect to the flywheel 1. After heating the ring gear 10 to radially expand the ring gear 10, the ring gear 10 can then be slid onto the flywheel and about the tabs 8. The ring gear 10 would then shrink as it cools onto the circumferential area of the flywheel 1, thereby generating a radial inward force which causes a pressing of the clutch housing 9 by means of its tabs 8 and the clamping elements 5 onto the flywheel 1.

Figure 3:
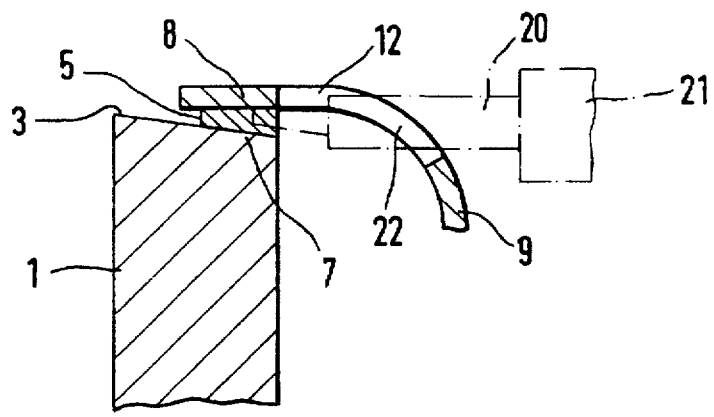
FIG. 3 shows the area of the connection between the clutch housing and flywheel illustrated in FIG. 1, on a larger scale, but with a clamping device which acts in the opposite direction.

FIG. 3 illustrates a flywheel whose outside diameter increases in the direction away from the clutch housing 9. In this configuration, starting from the side of the clutch housing 9, the clamping element 5 can be pushed between the clutch housing 9 and the flywheel 1. The clamping element 5 can be tapered in a wedge shape on its side facing away from the clutch housing 9, and can be pushed into its operating position, from the position illustrated in broken lines, by a pressure application member 20 (shown only schematically, also in broken lines) of a pressure device or tool 21. Since the clamping element 5 is being inserted from the clutch housing 9 side of the flywheel 1, the clutch housing 9 can be provided with a recess 22 in the appropriate area, for the passage of the pressure application member 20 therethrough. Such a pressure application member 20 could be a simple rod which is struck by a tool 21, such as a hammer, or could entail a more sophisticated pressure application device wherein the member 20 could be a piston rod of a hydraulic tool 21.

Figure 4:
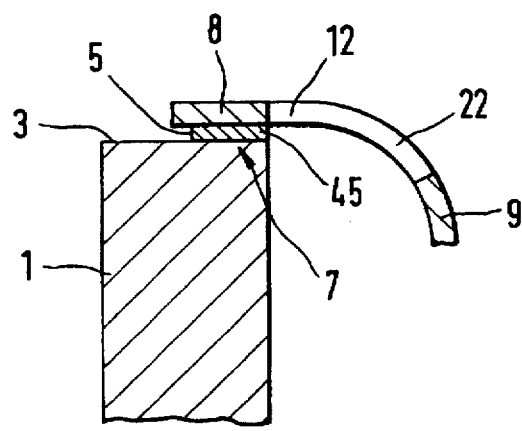
FIG. 4 is similar to FIG. 3, but with a clamping device which has a square cross section.

The configuration illustrated in FIG. 4 essentially corresponds to the configuration illustrated in FIG. 3, except that the clamping element 5 has an essentially square cross section instead of a wedge-shaped cross section. Accordingly, the outside diameter of the flywheel 1 can then extend essentially parallel to the cylindrical wall 12 of the clutch housing 9. The clamping device 7 in this figure, like the clamping devices 7 in FIGS. 1, 2 or 3, can be formed by a number of clamping elements 5 oriented at predetermined angles to one another. In other words, the clamping elements 5 can be spaced apart from one another about the circumference of the flywheel 1. For example, it might be desirable to have a minimum of three such clamping elements 5 disposed at about 120 degrees with respect to one another. Alternatively, there could be four clamping elements disposed at about 90 degrees from one another, five at about 72 degrees, six at about 60 degrees, etc.

Alternatively, instead of a multiplicity of clamping element 5, a single clamping element 5 could be provided in the form of a closed ring 45, which closed ring 45 can preferably surround the axis of rotation 2, or, in other words, be disposed about the flywheel 1 in the area of contact between the flywheel 1 and the clutch housing 9. The latter arrangement has the advantage that the adhesion between the clutch housing 9 and the flywheel 1 acts along the total circumferential area of the flywheel.

Figure 5:
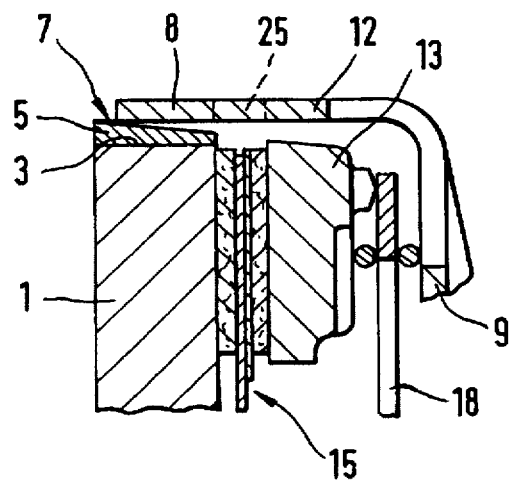
FIG. 5 is similar to FIG. 1, but with a fixed, wedge-shaped clamping device on the flywheel.

FIG. 5 illustrates an embodiment in which the clamping element 5 is fastened to the radially outer area of the flywheel 1. In the depicted embodiment of FIG. 5, the clamping element 5 has a wedge-shaped cross section which tapers, or becomes narrower, in a direction toward the clutch housing 9. Thus, during assembly, when there is an axial movement of the clutch housing 9 toward the flywheel 1, a non-positive connection can be created between the flywheel 1 and the clutch housing 9 as soon as the clutch housing 9 has travelled a predetermined axial distance over the clamping elements 5.

The embodiment illustrated in FIG. 5 would also work in a similar manner, if the clamping element 5 was preferably designed as one piece with the flywheel 1. In other words, when the flywheel 1 is cast, the mold for the flywheel 1 can already be configured with clamping elements 5 so that the clamping elements 5 are formed as an integral part of the flywheel 1.

Figure 6:
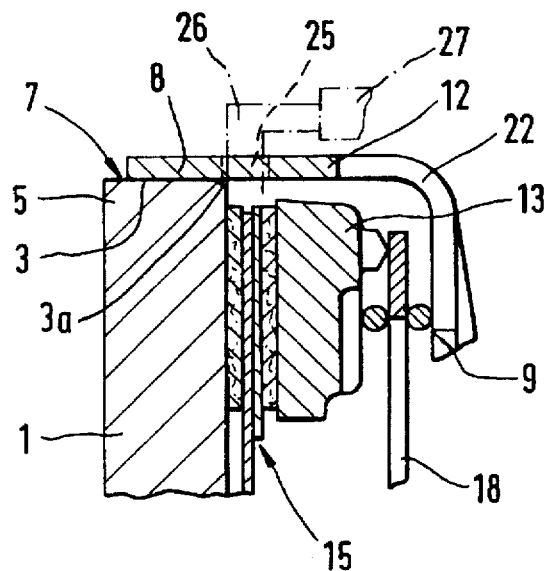
FIG. 6 is similar to FIG. 5, but without a wedge-shaped configuration of the clamping device.

Such a one-piece configuration of the flywheel 1 and the clamping elements 5 is illustrated in FIG. 6. However, in FIG. 6, while the clamping element 5 is integrated into the flywheel 1, the clamping element 5 extends substantially parallel to the tab 8 and thus parallel to the cylindrical wall 12 of the clutch housing 9. With such a configuration, a non-positive connection can preferably be created by heating the clutch housing 9, thereby causing the clutch housing 9 to expand radially outwardly before the housing 9 is slid onto the flywheel 1. After the clutch housing 9 is slid onto the flywheel 1, the clutch housing can be allowed to cool and shrink back to essentially its original size. In so doing, the non-positive connection between the flywheel 1 and the clutch housing 9 can be created.

Another possible mode of assembly for such a configuration would be an essentially force-fit assembly of the clutch housing 9 about the flywheel 1. In this embodiment, the housing 9 could have a slightly smaller internal diameter than the external diameter of the flywheel 1. Then, by providing a bevelled or rounded corner 3a, it could be possible to force-fit the clutch housing 9 onto the flywheel 1 by slightly forcing the diameter of the housing 9 to be increased to fit about the flywheel 1. This could be achieved by applying a pressure on the clutch housing 9 to force the clutch housing 9 over the flywheel 1. In essence, in at least one embodiment of the present invention, an elastic, or plastic deformation of the clutch housing 9 could occur to permit the clutch housing 9 to fit about the flywheel 1. Because after such a deformation, the clutch housing would essentially want to return to its original state, a clamping force would be generated between the clutch housing 9 and the flywheel 1, to thereby generate a friction force to hold the clutch housing 9 and the flywheel 1 together.

If, for disassembly of the clutch housing 9, the clutch housing 9 must be removed from the flywheel 1, notches 25 can preferably be provided in the cylindrical wall 12 of the clutch housing 9, as shown in FIGS. 5 and 6. These notches can be used to accommodate a tension device 26 (schematically illustrated in FIG. 6) of an extraction tool 27.

Figure 7:
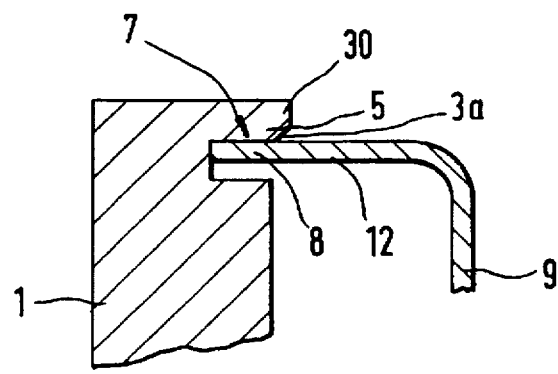
FIG. 7 illustrates a flywheel for the non-positive mounting of the clutch housing via the radially outer side of the clutch housing.

As a variation on the embodiments illustrated in the preceding figures, FIG. 7 illustrates an embodiment in which the tabs 8 of the cylindrical wall 12 of the clutch housing 9 are supported radially outwardly by the flywheel 1. In this case, the clamping elements 5 of the clamping device 7 can be located on a projection, or web 30 of the flywheel 1, on the radial inside wall of the web 30, whereby the web 30 faces the tabs 8 and extends axially towards the clutch housing 9. The clamping elements 5, as explained with reference to the preceding examples, can be designed with a wedge-shaped or square cross section, and can be manufactured either as a separate element or as a part of the flywheel 1, or can even be designed as a ring which encircles the flywheel 1 on the radial inside of the web 30. As shown in FIG. 7, the clamping element 5 can be one piece with the web 30 and can essentially extend parallel to the web 30 on its side facing the tabs 8.

In one possible configuration for the embodiment of FIG. 7, if the outside diameter of the cylindrical wall 12 at the tabs 8 is slightly greater than an inside diameter of the clamping elements 5 within the web 30, the tabs 8 can essentially be slightly deformed radially inwardly during assembly, thereby prestressing the tabs 8 in the radially outward direction. This prestress can then generate sufficient friction between the tabs 8 and clamping element 5 to hold the clutch housing 9 to the flywheel 1.

Figure 8:
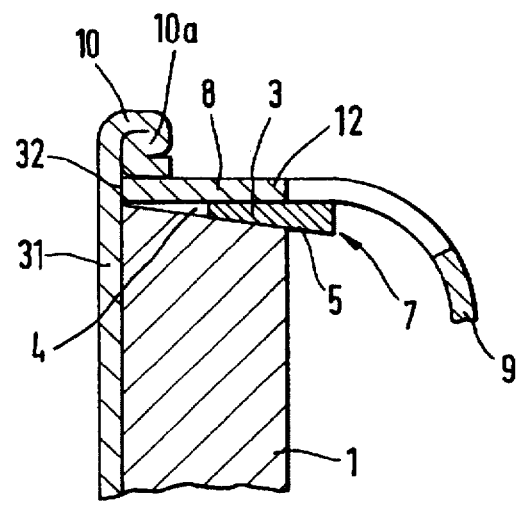
FIG. 8 is similar to FIG. 3, but with a flexible plate on the side of the flywheel facing away from the clutch housing.

FIG. 8 illustrates still another embodiment of a clamping arrangement, in which there is a flexible plate 31 on the side of the flywheel 1 facing away from the clutch housing 9. The flywheel 1 is connected by means of this plate 31 with the crankshaft 40 of an internal combustion engine, in a manner similar to that illustrated in FIG. 1a. The flexible plate 31 can preferably extend beyond the outer circumference of the flywheel 1 in the radial direction, and can preferably be provided with a bead 10a, formed by folding over an outer edge of the flexible plate 31.

As shown, a depression 4 can preferably be formed between the bead 10a and the flywheel 1, wherein the tabs 8 of the cylindrical wall 12 can preferably be inserted into this depression 4. By means of a wedge-shaped clamping element 5 inserted radially within the outer cylindrical wall 12, between the wall 12 and the flywheel 1, a radially outward pressure can be applied to the tabs 8, so that the bead 10a can be engaged from radially outside with the tabs 8 of the wall 12 of the clutch housing 9. In an alternative embodiment, the bead 10a of the plate 31 can also serve to form the starter ring gear 10, wherein the bead 10a can be shaped as teeth in the circumferential direction about the flywheel 1. In addition, the flexible plate 31 can also serve as an axial stop 32 for the free ends of the tabs 8. Otherwise, this embodiment, with regard to the configuration and orientation of the flywheel 1, clamping device 7 and clutch housing 9, essentially corresponds to the embodiment illustrated in FIG. 3.

In the embodiments as set forth above, the diametral area 3 and the tabs 8 would not necessarily need to be completely concentric to the axis of rotation about the entire diameter thereof. In general, non-round shapes, such as a scalloped shape, would be feasible within the context of the present invention if at least portions of the diametral area 3 and tabs 8 had a dimension which was parallel to the axis of rotation 2, so that the parts could essentially be slid onto one another in the axial direction, and then maintained together by friction. The frictionally engaged surfaces would essentially be disposed radially to one another.

One feature of the invention resides broadly in the friction clutch with a flywheel which has a predetermined diametral area which is designed for the mounting of a preferably cylindrical wall of a clutch housing, which mounting is non-rotational and secured against axial movements, characterized by the fact that there is a clamping device 7 allocated to at least one of the two elements: flywheel 1 or clutch housing 9, in the area of contact between the cylindrical wall 12 and the predetermined diametral area 3, by means of which the above-mentioned element 1, 9 can be held in a non-positive connection with the respective other element 1, 9.

Another feature of the invention resides broadly in the friction clutch characterized by the fact that the clamping device 7 has at least one clamping means 5 located between the predetermined diametral area 3 of the flywheel 1 and the preferably cylindrical wall 12 of the clutch housing 9.

Yet another feature of the invention resides broadly in the act that on at least one of the two elements 1, 9, in the area of contact with the respective other element 1, 9, at least one clamping means 5 of the clamping device 7 is fastened.

Still another feature of the invention resides broadly in the friction clutch characterized by the fact that at least one of the two elements 1, 9 in the area of contact with the respective other element 1, 9 is designed as a single piece with at least one clamping means 5 of the clamping device 7.

A further feature of the invention resides broadly in the friction clutch characterized by the fact that the clamping means 5 have a wedge-shaped cross section.

Another feature of the invention resides broadly in the friction clutch characterized by the fact that the clamping means 5 are formed by a ring 45 which surrounds the axis of rotation 2 of the flywheel 1.

Yet another feature of the invention resides broadly in the friction clutch characterized by the fact that the clamping device 7 can be activated by shrink-fitting one of the two elements 1, 9 onto the other.

Still another feature of the invention resides broadly in the friction clutch characterized by the fact that the clutch housing 9 is provided with numerous recesses 22, which are provided for the connection of pressure means 20 of a pressure device 21 which activates the clamping device 7.

A further feature of the invention resides broadly in the friction clutch characterized by the fact that the clutch housing 9 has a number of notches 25, which are used for the connection of tension means 26 of an extraction device 27 which cancels out the action of the clamping device 7.

Another feature of the invention resides broadly in the friction clutch with a flywheel which is fastened by means of a flexible plate to the drive shaft (not shown) of an engine, preferably of an internal combustion engine, characterized by the fact that in the area of attachment of the tabs 8 of the wall 12 of the clutch housing 9, the plate 31 acts as the stop which limits the axial movement of the clutch housing 9 required during assembly.

Yet another feature of the invention resides broadly in the friction clutch characterized by the fact that the plate, with its radially outer area, encloses the wall 12 of the clutch housing 9, and in this area is designed a starter ring gear 10.

Some examples of transmissions in which the present invention may be used, may be disclosed by the following U.S. Patents: U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of clutch assemblies and the components thereof which could possibly be used in conjunction with the present invention may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; and U.S. Pat. No. 4,651,857 to Schraut et al., entitled "Clutch Disc Unit for a Motor Vehicle Clutch".

Some examples of release assemblies for friction clutches, and some examples of friction clutches are disclosed in the following U.S. Patents: U.S. Pat. No. 4,201,282 to Ernst et al. on May 6, 1980, entitled "Clutch Release Assembly and Bearing Therefor"; U.S. Pat. No. 3,920,107 to Limbacher on Nov. 18, 1975, entitled "Self-Aligning Clutch Release Bearing Arrangement"; U.S. Pat. No. 4,781,050 to Link et al. on Oct. 3, 1989, entitled "Clutch Arrangement"; U.S. Pat. No. 4,542,813 to Schierling on Sep. 24, 1985, entitled "Frictional Clutch Assembly"; and U.S. Pat. No.

4,637,505 to Huber on Jan. 20, 1987, entitled "Fluid-operated Clutch Disengaging Apparatus".

Types of membrane springs which could be used in accordance with the embodiments of the present invention are disclosed in the following U.S. Patents: U.S. Pat. No. 5,240,227 to Sich on Aug. 31, 1993, entitled "Electromagnetically Operated Valve"; U.S. Pat. No. 4,890,815 to Hascher et al. on Jan. 2, 1990, entitled "Valve with Membrane Spring"; U.S. Pat. No. 4,535,816 to Feder et al. on Aug. 20, 1985, entitled "Pressure Controller"; U.S. Pat. No. 3,902,527 to Schwerin et al. on Sep. 2, 1975, entitled "Electromagnetically Actuatable Multipath Valve"; and U.S. Pat. No. 2,117,482 to Klix entitled "Clutch Lever Plate".

Some examples of concepts relating to elastic and plastic deformation in general, which could relate accordingly to the elastic and plastic deformations that could embody one manner in which the clutch housing 9 and flywheel 1 of the present invention are assembled together may be, or are disclosed in the following U.S. Patents: U.S. Pat. No. 5,195,213 to Ohgami and Hosoi; U.S. Pat. No. 5,197,188 to Maus and Swars; U.S. Pat. No. 5,232,302 to Wagner, Schulter, and Strohhausl; U.S. Pat. No. 5,239,892 to Sakai; U.S. Pat. No. 5,267,725 to Wode, Hasselbring and Schneider; U.S. Pat. No. 5,267,807 to Biedermann, Lauscher, and Premiski; and U.S. Pat. No. 5,351,796 to Uenohara.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 24 479.7, filed on Jul. 12, 1994, having inventors Michael Grosse-Erdmann, Joseph L. Bair, Edwin Murray, Gerda Rudolph, Peter Doll, Heiko Schulz-Andres, George Traub, and Reinhold Weidinger, and DE-OS P 44 24 479.7 and DE-PS P 44 24 479.7, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch and flywheel in combination for transmitting mechanical rotary power from an output shaft of an engine of a motor vehicle to an input shaft of a transmission of the motor vehicle, said friction clutch and flywheel combination comprising:

a clutch portion;
said clutch portion comprising:
a hub;
said hub defining an axis of rotation;
said hub comprising means for non-rotationally connecting said hub to an input shaft of a transmission;
a hub disc disposed about said hub;
said hub disc comprising means for non-rotationally connecting said hub disc to said hub;
at least a first plate rotatable about said axis of rotation relative to said hub;
first means for transmitting rotational torque between said hub disc and said at least a first plate for rotating said hub disc with said at least a first plate;
friction linings disposed on said at least a first plate;
a housing disposed about at least a portion of said clutch;
said housing having a wall portion disposed about said axis of rotation;
said friction clutch and flywheel combination further comprising a flywheel portion;
said flywheel portion comprising:
a disc-shaped member for being disposed axially adjacent said friction linings;
said friction linings being disposed to engage with said disc-shaped member and disposed to rotate with said disc-shaped member; and
means for non-rotationally connecting said disc-shaped member to an output shaft of an internal combustion engine for rotation of said disc-shaped member with the output shaft; and
said friction clutch and flywheel combination further comprising holding means for substantially permanently holding said housing and said disc-shaped member together;
said holding means providing a frictional engagement for holding said housing and said disc-shaped member together;
said frictional engagement comprising substantially the sole means for holding said housing and said disc-shaped member together; and
said holding means being disposed between at least a portion of said housing and at least a portion of said disc-shaped member.

2. The friction clutch and flywheel combination according to claim 1, wherein:
said disc-shaped member comprises at least one first portion for being frictionally engaged with said wall portion of said housing;
each of said at least one first portion having a first surface disposed towards said wall portion of said housing;
each said first surface having at least one substantially linear portion;
said wall portion of said housing comprises an end disposed towards said disc-shaped member, said end comprising at least one second portion for being frictionally engaged with said at least one first portion of said disc-shaped member;
each of said at least one second portion having a second surface disposed towards said first surfaces of said disc-shaped member;
each said second surface having at least one substantially linear portion;
at least one of: said first surface and second surface being disposed substantially parallel to said axis of rotation; and
said holding means providing frictional engagement substantially solely between said first and second surfaces to hold said housing and said disc-shaped member together in a non-rotational and non-axially movable connection.

3. The friction clutch and flywheel combination according to claim 2, wherein:
said holding means comprises at least one holding element;
said holding means comprises one of the following configurations A) and B):
A) said at least one holding element is disposed between said first surface of said disc-shaped member and said second surface of said wall housing; and
B) said at least one holding element is an integral unitary part of at least one of: said first surface of said disc-shaped member and said second surface of said wall housing.

4. The friction clutch and flywheel combination according to claim 3, wherein:

said wall portion of said housing comprises a substantially cylindrical wall portion;

said substantially cylindrical wall portion comprises said at least one second portion;

said at least one second portion comprises at least one tab extending axially away from said end of said wall portion;

each said at least one tab comprises each said at least one second surface;

each said at least one second surface is substantially concentric with said axis of rotation; and said at least one holding element comprises a ring-shaped portion substantially concentric with said axis of rotation.

5. The friction and flywheel combination according to claim 4, wherein:

said at least one holding element comprises a first end, a second end, a length dimension extending between said first and second ends, said length dimension being defined substantially parallel to said axis of rotation;

said at least one holding element further comprises one of the following configurations C) and D):

C) said at least one holding element is wedge-shaped in said length dimension wherein the width increases from said first end towards said second end; and D) said at least one holding element is rectangularly-shaped in said length dimension wherein the width is substantially constant from said first end towards said second end.

6. The friction clutch and flywheel combination according to claim 5 wherein:

an inner surface is disposed on said second portion of said housing;

said inner surface comprises each said second surface of said housing;

said holding means comprises one of the following configurations a) and b):

a) Configuration A of claim 3; and b) Configuration B of claim 3 wherein said at least one holding element is an integral unitary part of said first surface of said disc-shaped member;

said holding means is disposed between said inner surface of said housing and said disc-shaped member to frictionally engage said flywheel and said clutch housing;

at least one recess disposed in said clutch housing and extending through said clutch housing; and said at least one recess is configured for receiving pressure means of a pressure device for pressurizing said holding means.

7. The friction clutch and flywheel combination according to claim 6, wherein:

said holding means is configured as item b) of claim 6;

said at least one holding element comprises item D) of claim 5;

said disc-shaped member comprises an outer peripheral surface including each of said first surfaces;

said outer peripheral surface is substantially parallel with said axis of rotation;

said cylindrical wall portion comprises an inner peripheral surface including each of said second surfaces;

said inner peripheral surface is substantially parallel with said axis of rotation;

each of said inner and outer peripheral surfaces is configured to form a heat-shrink joint upon assembly;

said disc-shaped member is disposed within said cylindrical wall portion for forming a heat-shrink joint between said cylindrical wall portion and said disc-shaped member;

at least one notch disposed in and extending through said clutch housing;

said at least one notch is configured to receive tension means of an extraction device for relieving said holding means; and said heat-shrink joint generating said frictional engagement for holding said housing and said disc-shaped member together.

8. The friction clutch and flywheel combination according to claim 7, further comprising:

an outer ring member;

said outer ring member is disposed about said second portion of said housing to frictionally engage said outer ring member and said clutch housing;

said outer ring member being configured as one of the following configurations E) and F):

E) a substantially cylindrical member having an outer peripheral surface;

said outer peripheral surface comprises toothing for being engaged by a starter of a motor vehicle; and F) a flexible plate having a radially outer area;

said flexible plate being non-rotatably fastened to said disc-shaped member;

said flexible plate being disposed to limit axial movement of said cylindrical wall portion about said disc-shaped member;

said radially outer area comprises a bead extending axially away from said flexible plate in a direction radially outwardly of said at least one holding element;

said bead defining a radial gap between said bead and said at least one holding element;

said tabs of said cylindrical wall portion fit into said gap between said bead and said at least one holding element; and said bead comprises a radially outer periphery including toothing for being engaged by a starter of a motor vehicle.

9. A method for assembling a friction clutch and flywheel combination for transmitting mechanical rotary power from an output shaft of an engine to a secondary shaft for receiving mechanical rotary power, the clutch and flywheel combination comprising a flywheel, the flywheel comprising: a disc-shaped member, and means for non-rotationally connecting the disc-shaped member to an output shaft of an engine; the clutch and flywheel combination additionally comprising: a clutch, the clutch comprising: a hub, the hub defining an axis of rotation, the hub comprising means for non-rotationally connecting the hub to a second shaft for receiving mechanical rotary power; at least a first plate disposed with the hub; means for transmitting rotational torque between the hub and the at least a first plate for rotating the hub with the at least a first plate; friction linings disposed on the at least a first plate, and adjacent the disc-shaped member; and means for engaging and disengaging the friction linings with the disc-shaped member; and the clutch and flywheel combination further comprising a housing disposed about at least a portion of the clutch, said method comprising the steps of:

providing the clutch, said providing of the clutch comprising the steps of:
  providing the hub, the hub defining an axis of rotation;
  providing the means for non-rotationally connecting the hub to a second shaft;
  disposing the at least a first plate about the hub;
  providing the first means for transmitting rotational torque between the hub and the at least a first plate for rotating the hub with the at least a first plate;
  disposing friction linings on the at least a first plate; and
  providing the means for engaging and disengaging the friction linings with the disc-shaped member;
  providing the housing about at least a portion of the clutch;
providing the flywheel, said providing of the flywheel comprising:
  providing the disc-shaped member; and
  providing the means for non-rotationally connecting the disc-shaped member to an output shaft of an internal combustion engine; and
disposing at least a portion of the disc-shaped member radially adjacent to at least a portion of the housing; and
frictionally engaging the radially adjacent portions of the disc-shaped member and the housing to hold the housing and disc-shaped member together in a non-rotational and non-axially movable connection, wherein the frictionally engaged radially adjacent portions comprise substantially the sole means for holding the housing and the disc-shaped member together.

10. The method according to claim 9, wherein the disc-shaped member has an outer periphery and an outer peripheral area disposed adjacent the outer periphery, the housing comprises a substantially cylindrical wall portion disposed adjacent the disc-shaped member, and said method further comprises the steps of:
  configuring at least a portion of the outer peripheral area of the disc-shaped member to comprise the radially adjacent portion of the disc-shaped member;
  configuring the cylindrical wall portion of the housing to comprise an end disposed towards the disc-shaped member;
  configuring at least a portion of the end to comprise the radially adjacent portion of the housing;
  disposing one of:
    the at least a portion of the outer peripheral area, and
    the at least a portion of the end of the cylindrical wall portion
    radially outwardly of the other to provide a radially outward portion for engaging and a radially inward portion for engaging;
  providing at least one holding element means to establish the frictional engagement between the radially adjacent portions of the housing and the disc-shaped member; and
  disposing the at least one holding element means at one of the following locations A), B) and C):
    A) radially outwardly adjacent the radially outward portion for engaging to force the radially outward portion for engaging into frictional engagement with the radially inward portion for engaging;
    B) radially inwardly adjacent the radially inward portion for engaging to force the radially inward portion for engaging into frictional engagement with the radially outward portion for engaging; and
    C) between said radially outward portion for engaging and said radially inward portion for engaging to frictionally engage each of said radially outward and radially inward portions for engaging with the holding element means.

11. The method according to claim 10, wherein said method further comprises the step of configuring the at least one clamping element means to comprise one of the following configurations D), E) and F):
  D) at least one clamping element means fastened onto one of the following items a) and b):
    a) the at least a portion of the outer peripheral area, and
    b) the at least a portion of the end of the cylindrical wall portion;
  E) at least one clamping element means being an integral unitary part of one of the following items a) and b):
    a) the at least a portion of the outer peripheral area, and
    b) the at least a portion of the end of the cylindrical wall portion; and
  F) at least one individual clamping element unit insertable between and removable from between the following items a) and b):
    a) the at least a portion of the outer peripheral area, and
    b) the at least a portion of the end of the cylindrical wall portion.

12. The method according to claim 11, wherein said method further comprises:
  heating the radially outwardly disposed one of items a) and b) of claim 11 to expand the radially outwardly disposed one of items a) and b);
  moving at least one of items a) and b) with respect to the other of items a) and b) to dispose the heated one of items a) and b) radially about the other of items a) and b);
  providing the at least one holding element means between items a) and b); and
  cooling the radially outwardly disposed one of items a) and b) to shrink the radially outwardly disposed one of items a) and b) into frictional engagement with the holding element means disposed between the items a) and b).

13. The method according to claim 12, wherein the at least one clamping element means comprises a first end, a second end, a length dimension disposed between the first and second ends, the length dimension for being disposed substantially parallel to the axis of rotation, and a width dimension for being disposed substantially radially to the axis of rotation; and the method further comprises the step of:
  configuring the at least one clamping element means to be wedge-shaped in the length dimension with a width which increases from the first end towards the second end; and
  configuring the at least one clamping element means as a ring-shaped clamping element for being disposed about the axis of rotation at one of the locations A), B) and C) of claim 10.

14. The method according to claim 13, wherein the disc-shaped member has a diameter, and said method further comprises the steps of:
  providing a flexible plate adjacent to the disc-shaped member, the flexible plate having a diameter and comprising the means for non-rotationally connecting the flywheel to an output shaft of an internal combustion engine;
  fastening the flexible plate to the disc-shaped member;
  configuring the flexible plate so that the diameter of the flexible plate is greater than the diameter of the disc-shaped member so that the flexible plate comprises a radially outer portion which extends beyond the periphery of the disc-shaped member;

disposing the end of the cylindrical wall portion radially about the disc-shaped member;

axially abutting the cylindrical wall portion with the flexible plate to limit axial movement of the cylindrical wall portion about the disc-shaped member;

configuring the radially outer area as a bead extending axially away from the flexible plate in a direction radially outwardly over the disc-shaped member;

configuring the bead such that the bead defines a gap between the bead and the periphery of the disc-shaped member;

fitting the end of the cylindrical wall portion into the gap between the bead and the periphery;

disposed the clamping element means between the disc-shaped member and the cylindrical wall portion to frictionally engage the first end of the cylindrical wall portion radially outwardly with the bead;

configuring the bead to comprise a radially outer periphery; and configuring the radially outer periphery of the bead as toothing for being engaged by a starter of a motor vehicle.

15. The method according to claim 9, wherein the disc-shaped member has an outer periphery and an outer peripheral area disposed adjacent the outer periphery, the housing comprises a substantially cylindrical wall portion disposed adjacent the disc-shaped member, the cylindrical wall portion has a second end disposed away from the disc-shaped member, the housing comprises a base portion at the second end, and said method further comprises the steps of:

configuring at least a portion of the outer peripheral area of the disc-shaped member to comprise the radially adjacent portion of the disc-shaped member;

configuring the cylindrical wall portion of the housing to comprise an end disposed towards the disc-shaped member;

configuring at least a portion of the end to comprise the radially adjacent portion of the housing;

disposing one of:
the at least a portion of the outer peripheral area, and
the at least a portion of the end of the
cylindrical wall portion
radially outwardly of the other to provide a radially outward portion for engaging and a radially inward portion for engaging;

providing a plurality of holding element means for being disposed spaced apart from one another about the axis of rotation;

providing a plurality of openings in the base portion adjacent the cylindrical wall portion;

said providing of the openings comprising:
configuring the openings to have a size appropriate for passage of at least one of the plurality of holding element means therethrough for insertion of said at least one of said plurality of clamping elements through said opening; and configuring each of the openings for receiving a pressure application tool therethrough for applying pressure to the at least one of the plurality of holding elements inserted through the openings;

during assembly of the transmission device, applying force to the holding element means to force the holding element means into one of the following locations A) and B):

A) radially inwardly adjacent the radially inward portion for engaging to force the radially inward portion for engaging into frictional engagement with the radially outward portion for engaging; and B) between said radially outward portion for engaging and said radially inward portion for engaging to frictionally engage each of said radially outward and radially inward portions for engaging with the holding element means;

providing a plurality of notches through the cylindrical wall portion substantially adjacent the first end of the cylindrical wall portion, said providing of the plurality of notches comprising configuring the notches for receiving elements of an extraction tool therein, the extraction tool being for releasing the frictional engagement between the cylindrical wall portion and the disc-shaped member to separate the cylindrical wall portion and the disc-shaped member; and for disassembly of the transmission device:
inserting elements of an extraction tool through the notches;

radially outwardly lifting the cylindrical wall portion to release the frictional engagement; and axially moving the cylindrical wall portion away from the disc-shaped member.

16. A motor vehicle clutch, said motor vehicle clutch comprising:

a flywheel;

a clutch housing;

holding means for substantially permanently holding said clutch housing and said flywheel together;

said holding means comprising a heat shrink joint;

said heat shrink joint comprising substantially the sole means for holding said clutch housing and said flywheel together; and said heat shrink joint comprising:
one of: said flywheel and said clutch housing comprising a male portion;
the other of: said flywheel and said clutch housing comprising a female portion;
said male portion and said female portion having been held at substantially different temperatures to permit said male portion to fit within said female portion; and
said female portion and said male portion having been substantially equalized in temperature to permit said female portion to grasp said male portion.

17. The motor vehicle clutch according to claim 15, wherein:

said motor vehicle clutch has an axis of rotation;

said flywheel comprises said male portion;

said clutch housing comprises said female portion;

said male portion of said flywheel comprises a cylindrical portion;

said cylindrical portion is substantially concentric with the axis of rotation;

said cylindrical portion comprises an outer cylindrical surface;

said clutch housing comprises a cylindrical wall portion;

said cylindrical wall portion is substantially concentric with the axis of rotation;

said clutch housing comprises a plurality of tabs extending axially away from said cylindrical wall portion;

each of said plurality of tabs comprises a surface disposed towards said outer cylindrical surface of said flywheel; and said female portion of said clutch housing comprises each of said surfaces of said plurality of tabs.

18. The motor vehicle clutch according to claim 17, wherein:

said cylindrical wall portion comprises a plurality of notches;

each of said plurality of notches is disposed to extend through said cylindrical wall portion; and said plurality of notches comprises means for receiving and engaging with a tension device for disassembling said clutch housing and said flywheel.

19. A method for assembling a motor vehicle clutch, said motor vehicle clutch comprising a flywheel and a clutch housing, one of: the flywheel and the clutch housing comprising a male portion, the other of: the flywheel and the clutch housing comprising a female portion, the male portion having an outer surface, the outer surface of the male portion being configured not to fit within the female portion when the male portion and the female portion are at substantially the same temperature, said method comprising the steps of:

providing the flywheel;

providing the clutch housing;

substantially changing the temperature of one of: said male portion and said female portion with respect to the temperature of the other of: said male portion and said female portion;

disposing the male portion within the female portion; and substantially equalizing the temperatures of said male portion and said female portion to interlock said female portion and said male portion and form a heat shrink joint.

20. The method for assembling a motor vehicle clutch according to claim 19, wherein the flywheel comprises the male portion and the clutch housing comprises the female portion.

* * * * *

UNITED STATES PATENT AND TRADEMARK OFFICE
CERTIFICATE OF CORRECTION

PATENT NO. : 5,634,542
DATED : June 3, 1997
INVENTOR(S) : Michael GROSSE-ERDMANN, Joseph L. BAIR, Edwin MURRAY, Gerda RUDOLPH, Peter DOLL, Heiko SCHULZ-ANDRES, George TRAUB and Reinhold WEIDINGER It is certified that error appears in the above-identified patent and that said Letters Patent is hereby corrected as shown below:

In column 18, line 51, Claim 17, after 'claim', delete "15," and insert --16,--.

Signed and Sealed this

Seventh Day of October, 1997

BRUCE LEHMAN

Attest:

Attesting Officer

Commissioner of Patents and Trademarks